US012764806B2

(12) United States Patent
Sato

(10) Patent No.: US 12,764,806 B2
(45) Date of Patent: Oct. 13, 2026

(54) STORAGE MEDIUM STORING PROGRAM, ELECTRONIC DEVICE, AND METHOD OF CONTROLLING ELECTRONIC DEVICE

(71) Applicant: CANON KABUSHIKI KAISHA, Tokyo (JP)

(72) Inventor: Haruna Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 18/663,187

(22) Filed: May 14, 2024

(65) Prior Publication Data

US 2024/0397561 A1 Nov. 28, 2024

(30) Foreign Application Priority Data

May 22, 2023 (JP) ................................. 2023-084161

(51) Int. Cl.
*H04W 76/10* (2018.01)
*G06F 3/12* (2006.01)

(52) U.S. Cl.
CPC .......... *H04W 76/10* (2018.02); *G06F 3/1293* (2013.01)

(58) Field of Classification Search
None
See application file for complete search history.

(56) References Cited

U.S. PATENT DOCUMENTS 8,456,668 B1 * 6/2013 Ruel ....................... G06F 9/468 358/1.15
10,664,202 B2 * 5/2020 Hardy .................. G06F 3/1226
11,917,512 B2 * 2/2024 Suzuki ................. H04W 76/10
2005/0094175 A1 * 5/2005 Christiansen ...... G06K 15/1859 358/1.15
2013/0027741 A1 * 1/2013 Liu ....................... G06F 3/1204 358/1.15
2020/0133605 A1 * 4/2020 Kurihara ............... G06F 3/1292
2021/0096791 A1 * 4/2021 Nampo ................. G06F 3/1238
2023/0008439 A1 * 1/2023 Sakai .................... G06F 3/1205

FOREIGN PATENT DOCUMENTS

JP 2009301138 A 12/2009
JP 2018191252 A 11/2018
JP 2021190866 A 12/2021
JP 2022097668 A 6/2022

OTHER PUBLICATIONS

Japanese Office Action dated Jul. 8, 2024 in counterpart Japanese Patent Appln. No. 2023-084161.

* cited by examiner

*Primary Examiner* — Lonnie V Sweet
(74) *Attorney, Agent, or Firm* — Venable LLP

(57) ABSTRACT

An electronic device obtains predetermined information on whether a privilege is an administrator privilege; and based on the obtained predetermined information, controls so as to: in a case where the privilege is the administrator privilege, regardless of whether a state of a setting related to a network satisfies a predetermined condition, perform communication in first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device.

24 Claims, 10 Drawing Sheets

STORAGE MEDIUM STORING PROGRAM, ELECTRONIC DEVICE, AND METHOD OF CONTROLLING ELECTRONIC DEVICE

BACKGROUND OF THE INVENTION

Field of the Invention

The present invention relates to a storage medium storing a program for communicating with an external device, an electronic device, and a method of controlling the electronic device.

Description of the Related Art

A technique in which an electronic device, such as a PC, communicates with an external device, such as a printer, via a local area network (hereinafter referred to as LAN) is known. In some cases, the LAN is constructed by a wireless network, which is more convenient than a wired network in that it does not limit where a communication device is installed. Japanese Patent Laid-Open No. 2018-191252 discloses a technique for connecting a printer, which is an external device that can be used via a PC which is an electronic device, to a wireless network. Japanese Patent Laid-Open No. 2018-191252 discloses that a wireless interface (hereinafter referred to as I/F) of the printer is operated as an access point (hereinafter referred to as AP) for temporary connection and the PC temporarily connects in first communication mode to the wireless I/F of the printer via a wireless LAN and then transmits, to the printer via the wireless LAN, connection information for the printer, which is to operate as a specific AP, to establish connection in second communication mode.

SUMMARY OF THE INVENTION

The present invention provides a mechanism for preventing user convenience from decreasing in execution of a function that uses predetermined communication between an electronic device and an external device.

The present invention in one aspect provides a non-transitory computer-readable storage medium storing one or more programs configured to cause one or more computers to function as: an obtainment unit configured to obtain predetermined information on whether a privilege is an administrator privilege; and a control unit configured to perform control so as to: based on the predetermined information obtained by the obtainment unit, in a case where the privilege is the administrator privilege, regardless of whether a state of a setting related to a network satisfies a predetermined condition, perform communication in first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device.

According to the present invention, it is possible to prevent user convenience from decreasing in execution of a function that uses predetermined communication between an electronic device and an external device.

Further features of the present invention will become apparent from the following description of exemplary embodiments with reference to the attached drawings.

DESCRIPTION OF THE EMBODIMENTS

Figure 1:
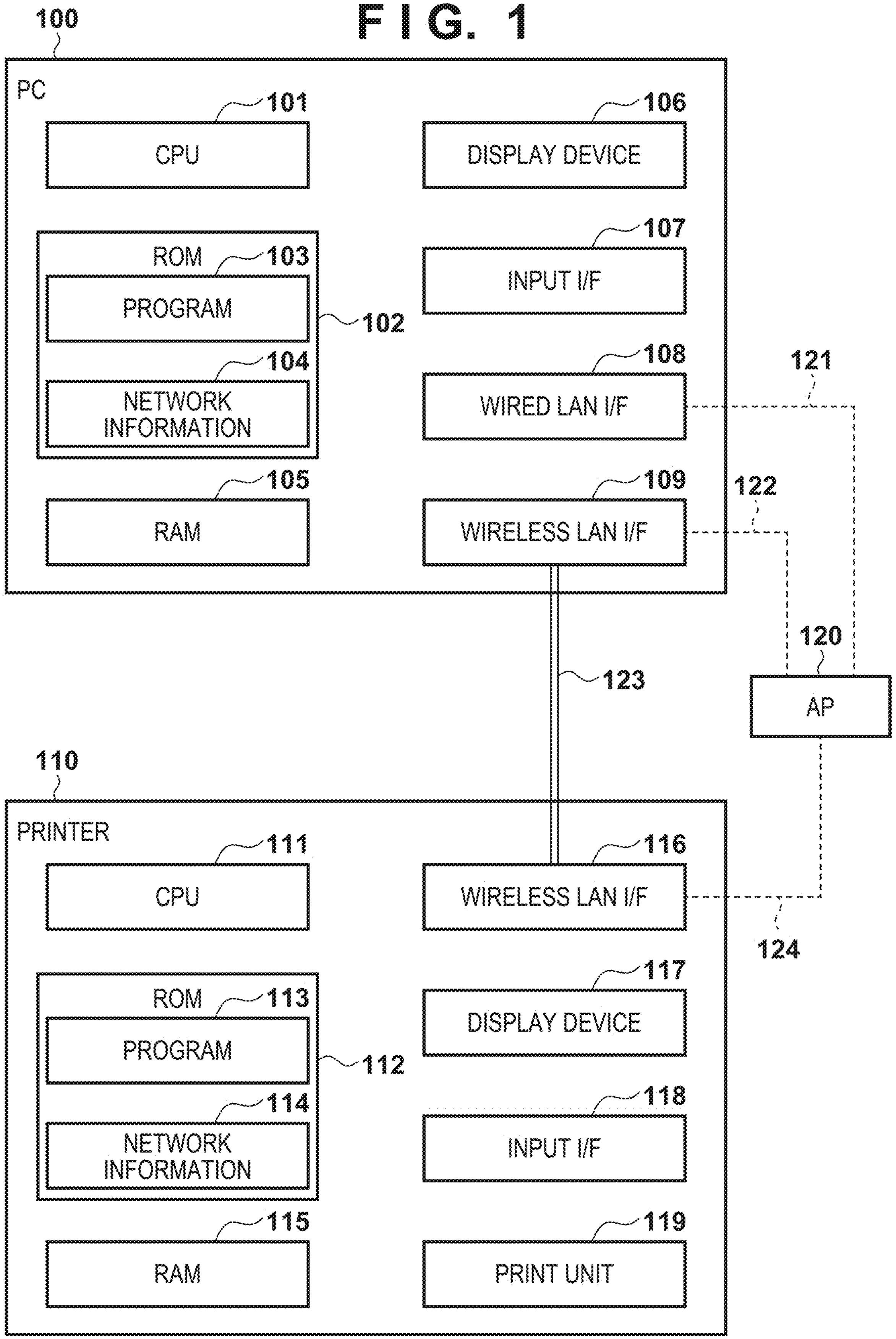
FIG. 1 is a diagram illustrating a configuration of a system and an apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Depending on a setting state and user privileges of an electronic device, predetermined communication with an external device is restricted and a function that uses that communication cannot be executed, and so, user convenience decreases.

According to the present disclosure, it is possible to prevent user convenience from decreasing in execution of a function that uses predetermined communication between an electronic device and an external device.

First Embodiment

FIG. 1 is a diagram illustrating an example of an overall configuration of a system according to the present embodiment. The present system includes a PC 100 which is an example of an electronic device, a printer 110 which is an example of an external device, and an access point (AP) 120. In the system of FIG. 1, the printer 110 can receive connection information (wireless profile information) necessary for connecting with the AP 120 from the PC 100 and execute connection setting, that is, network setup.

The PC 100 includes a CPU 101, a ROM 102, a RAM 105, a display device 106, an input I/F 107, a wired LAN I/F 108, and a wireless LAN I/F 109. The ROM 102, the RAM 105, the CPU 101, and the like form a computer of the PC 100 that executes programs.

The CPU 101 is a processor that reads and executes control programs stored in the ROM 102 and controls the entire PC 100 according to the control programs and also executes processes illustrated in flowcharts to be described later. Then, as a result of the control programs being executed, various functions of the PC 100, such as control for communication with an external device such as the printer 110, generation of a print job to be output to the printer 110, and instruction of network setup, are realized. The RAM 105 is constituted by a DRAM, an SRAM, or the like, which requires a backup power supply, and is used as a memory area for storing temporary setting information, management data, and the like for when the PC 100 operates. The RAM 105 is also used as a temporary storage region, such as a main memory and a work area of the CPU 101, and is also used as a transmission buffer and the like for temporarily storing a print job generated to be transmitted to the printer 110.

The ROM 102 is a non-volatile flash memory for storing fixed data, such as the control programs to be executed by the CPU 101, data tables, and an embedded operating system (hereinafter referred to as OS), and programs.

In the present embodiment, the respective control programs stored in the ROM 102 perform software execution control, such as scheduling, task switching, and interrupt processing, under the control of the embedded OS stored in the ROM 102.

The ROM 102 stores a setup application program 103 for performing network setup of the printer 110, a printer driver for generating a print job that can be interpreted by the printer 110, and the like as some of the control programs. Hereinafter, the setup application program 103 will be referred to as the setup program 103. The setup program 103 is an application program for performing setting for connecting with the AP 120, which is a connection destination of the printer 110, and may include other functions in addition to a network setup function. For example, the setup program 103 may include a function for causing the printer 110 to perform printing, a function for scanning a document set in the printer 110, a function for confirming the state of the printer 110, and the like. Further, the setup program 103 may include a function for transmitting information obtained from the printer 110, personal information of a user obtained in the PC 100, and the like to a service management server (not illustrated). The setup program 103 is stored in the ROM 102, for example, by being installed from an external server by Internet communication via the wireless LAN I/F 109. Assume that the setup program 103 is an application program provided by a vendor of the printer 110.

The ROM 102 also stores network information 104. The network information 104 stores IP addresses assigned to the wireless LAN I/F 109 and the wired LAN I/F 108 of the PC 100 and an IP address and a subnet mask of the AP 120 with which the PC 100 is connected. The network information 104 also stores wireless profile information of APs with which the PC 100 had been connected. In other words, the ROM 102 stores history information of APs with which the PC 100 had previously been connected. The wireless profile information includes service set identifiers (SSIDs), security settings, and passwords of APs with which the PC 100 had been connected.

The display device 106 is constituted by a light-emitting diode (LED), a liquid crystal display (LCD), or the like and displays data and also notifies a state of the PC 100. The input interface (I/F) 107 is an interface for receiving data input and instruction operations from the user by an operation unit, such as a keyboard, being operated. The operation unit may be a physical keyboard, a physical button, or the like or may be a software keyboard, a software button, or the like displayed on the display device 106. That is, the input interface 107 may accept input from the user via the display device 106.

The wired LAN I/F 108 and the wireless LAN I/F 109 are components for connecting with an external device, such as the printer 110 or the AP 120, and executing data communication. For example, the wireless LAN I/F 109 is capable of connecting to an access point (not illustrated) in the printer 110. Further, the wireless LAN I/F 109 includes an access point for connecting with a device, such as the printer 110, as an access point inside the PC 100. This use of an access point is commonly referred to as tethering. A wireless LAN I/F 116 of the printer 110 can connect to the access point. By the wireless LAN I/F 109 enabling the access point, the PC 100 operates as an access point. By connecting the wireless LAN I/F 116 and the access point in the wireless LAN I/F 109, it becomes possible for the PC 100 and the printer 110 to communicate with each other. In addition, if the wireless LAN I/F 109 of the PC 100 is connected to the Internet, the printer 110 can also connect to the Internet via the wireless LAN I/F 109. In the present embodiment, the PC 100 is capable of communicating with the printer 110 via an external device, which resides outside the PC 100 and the printer 110. The external device includes an external access point (e.g., AP 120), which resides outside the PC 100 and the printer 110, as well as a device, other than an access point, capable of relaying communication. A device such as a wireless LAN router can be given as an example of the AP 120. A method in which the PC 100 and the printer 110 are connected via the AP 120 is referred to as an infrastructure connection method. A wireless LAN connection 122 of FIG. 1 indicates a wireless connection with the AP 120 by the wireless LAN I/F 109 of the PC 100. A wired LAN connection 121 of FIG. 1 indicates a wired connection with the AP 120 by the wired LAN I/F 108 of the PC 100.

The PC 100 is capable of Peer to Peer connection (P2P connection or direct connection) with the printer 110 via a wireless LAN connection 123, which uses the wireless LAN I/F 109. The wireless LAN I/F 109 controls transmission and reception of data that conforms to a communication standard defined by IEEE 802.11 according to an instruction from the CPU 101. A wireless communication method used at that time is, for example, defined as WirelessFidelity (Wi-Fi)® by a world organization, Wi-Fi Alliance, and is defined as a wireless LAN standard.

The PC 100 may include as appropriate components other than that illustrated in FIG. 1. For example, it may include a short distance communication interface that performs communication using a communication method different from the wireless LAN I/F 109. With this, for example, the PC 100 can connect with a short distance communication interface of the printer 110 by a short distance communication method. For example, near field communication (NFC), Bluetooth® Classic, Bluetooth Low Energy (BLE), Wi-Fi Aware, and the like can be given as examples of communication methods employed at that time.

The printer 110 includes a CPU 111, a ROM 112, a RAM 115, the wireless LAN I/F 116, a display device 117, an input I/F 118, and a print unit 119. The ROM 112, the RAM 115, the CPU 111, and the like form a computer of the printer 110 that executes programs.

The CPU 111 is a processor that reads and executes control programs stored in the ROM 112 and controls the entire printer 110 according to the control programs and also executes processes illustrated in flowcharts to be described later. Then, as a result of the control programs being executed, various functions of the printer 110, such as control for communication with an external device such as the PC 100, are realized. The RAM 115 is constituted by a DRAM, an SRAM, or the like, which requires a backup power supply, and is used as a memory area for storing temporary setting information, management data, and the like for when the printer 110 operates. The RAM 115 is also used as a temporary storage region, such as a main memory and a work area of the CPU 111, and may operate as a reception buffer for temporarily holding print information received from the PC 100 or the like, for example.

The ROM 112 is a non-volatile flash memory for storing fixed data such as the control programs to be executed by the CPU 111, data tables, and an embedded OS. In the present embodiment, the respective control programs stored in the ROM 112 perform software execution control, such as scheduling, task switching, and interrupt processing, under the control of the embedded OS stored in the ROM 112.

The ROM 112 also stores network information 114. The network information 114 stores IP addresses assigned to the wireless LAN I/F 116 of the printer 110 and an IP address and a subnet mask of the AP 120 with which the printer 110 is connected. The network information 114 also stores wireless profile information of APs with which the printer 110 had been connected. In other words, the ROM 112 stores history information of APs with which the printer 110 had previously been connected. The wireless profile information includes SSIDs, security settings, and passwords of APs with which the printer 110 had been connected. The ROM 112 also stores a serial number or the like for identifying the printer 110. The ROM 112 also stores, for example, information indicating a usage status and remaining amount of ink.

The display device 117 is constituted by light-emitting diodes (LEDs), a liquid crystal display (LCD), or the like and displays various kinds of menus and also notifies the state of the printer 110. The input interface (I/F) 118 is an interface for receiving data input and instruction operations from the user by an operation unit, such as a keyboard, being operated. The operation unit may be a physical keyboard, a physical button, or the like or may be a software keyboard, a software button, or the like displayed on the display device 117. That is, the input interface 118 may accept input from the user via the display device 117.

The print unit 119 forms an image on a print medium, such as a cut sheet, by discharging a print agent, such as ink, onto the print medium based on image data and outputs a print result. In addition, the print unit 119 is configured to execute initial installation processing, which includes cleaning of a printhead and registration adjustment for adjusting an ink discharge position, when it is determined that a power-on is a power-on at the time of arrival. The print unit 119 may be configured to employ an inkjet printing method or another print method, such as an electrophotographic method.

The printer 110 is capable of Peer to Peer connection (P2P connection or direct connection) with the PC 100 via the wireless LAN connection 123, which uses the wireless LAN I/F 116. The wireless LAN I/F 116 controls transmission and reception of data that conforms to a communication standard defined by IEEE 802.11 according to an instruction from the CPU 111. A wireless communication system used at that time is, for example, defined as WirelessFidelity (Wi-Fi)® by a world organization, Wi-Fi Alliance, and is defined as a wireless LAN standard.

The printer 110 may include as appropriate components other than that illustrated in FIG. 1. For example, it may include a short distance communication interface that performs communication using a communication method different from the wireless LAN I/F 116. With this, for example, the printer 110 can connect with a short distance communication interface of the PC 100 by a short distance communication method. For example, near field communication (NFC), Bluetooth® Classic, Bluetooth Low Energy (BLE), Wi-Fi Aware, and the like can be given as communication methods at that time.

Modes and connection methods of executing wireless communication using the wireless LAN I/F 116 will be described below.

Regarding Direct Connection Method

Direct connection refers to a form in which devices are wirelessly connected to each other directly without going through an external device, such as the AP 120. Direct connection is also referred to as Peer to Peer connection (P2P connection). The printer 110 is capable of operating in a mode (direct connection mode) for performing communication by direct connection as one of the connection modes. In Wi-Fi communication, there are a plurality of modes for performing communication by direct connection, such as software AP mode and Wi-Fi Direct (WFD) mode.

A mode in which direct connection is executed by WFD is called the WFD mode. WFD is a standard established by Wi-Fi Alliance and is a standard included in an IEEE 802.11 series communication standard. In the WFD mode, after a search for a device to be a communication partner has been performed according to a device search command, P2P group owner (GO) and P2P client roles are determined, and then remaining wireless connection processing is performed. A group owner corresponds to a Wi-Fi master station (master device), and a client corresponds to a Wi-Fi slave station (slave device). This role determination is called GO Negotiation. In the WFD mode in a state prior to role determination, the printer 110 is in a state in which it is neither a master station nor a slave station. Specifically, between devices that perform communication, first, one device issues a device search command and searches for a device with which to connect in the WFD mode. When the other device to be a communication partner is found, information related to services and functions that each device can provide is confirmed between the two. This confirmation of device provision information is optional and not mandatory. This device provision information confirmation phase corresponds to, for example, P2P Provision Discovery. Next, by confirming each other's device provision information, it is determined which will be a P2P client and which will a P2P group owner. When the client and the group owner are determined, they exchange parameters for communicating with each other via WFD. Remaining wireless connection processing and IP connection processing are performed between the client and the group owner based on the exchanged parameters. In the WFD mode, the printer 110 may always operate as a GO without executing the above-described GO Negotiation in the printer 110. That is, the printer 110 may operate in WFD mode that is Autonomous GO mode. That is, a state in which the printer 110 is operating in the WFD mode is, for example, a state in which connection via WFD is not established but the printer 110 is operating as a GO or a state in which connection via WFD is established and the printer 110 is operating as a GO.

In the software AP mode, between devices (e.g., PC 100 and printer 110) that perform communication, one device (e.g., PC 100) is a client that fulfills a role of requesting various services. The other device realizes a function of an access point in Wi-Fi according to software settings. The software AP corresponds to a Wi-Fi master station, and a client corresponds to a Wi-Fi slave station. In the software AP mode, a client searches for a device to be the software AP according to a device search command. When the software AP is found, remaining wireless connection processing (e.g., establishment of wireless connection) is performed between the client and the software AP, and then IP connection processing (e.g., assigning of an IP address) is performed. Regarding commands and parameters to be transmitted and received when realizing wireless connection between the client and the software AP, those specified in a Wi-Fi standard may be used, and the description thereof will be omitted here.

In the present embodiment, when the printer 110 establishes and maintains direct connection, the printer 110 operates as a master station in a network to which it belongs. A master station is a device that constructs a wireless network and is a device that provides parameters used to connect to the wireless network to a slave station. The parameters used to connect to the wireless network are, for example, parameters related to channels used by the master station. By receiving the parameters, a slave station connects to the wireless network constructed by the master station using the channels used by the master station. In the direct connection mode, the printer 110 operates as a master station, and so, the printer 110 can determine which frequency bands and channels to use for communication in the direct connection mode. In the present embodiment, assume that the printer 110 can use channels corresponding to a 2.4-GHz frequency band and channels corresponding to a 5-GHz frequency band for communication in the direct connection mode.

Regarding Infrastructure Connection Method

Infrastructure connection is a connection form for devices (e.g., PC 100 and printer 110) that perform communication to connect with an access point (e.g., AP 120) that controls a network of the devices and communicate with each other via the access point. The printer 110 is capable of operating in a mode (infrastructure connection mode) for performing communication by infrastructure connection as one of the connection modes.

In infrastructure connection, each device searches for an access point according to a device search command. When an access point is found, remaining wireless connection processing (e.g., establishment of wireless connection) is performed between the device and the access point, and then IP connection processing (e.g., assigning of an IP address) is performed. Regarding commands and parameters to be transmitted and received when realizing wireless connection between the device and the access point, those specified in a Wi-Fi standard may be used, and the description thereof will be omitted here.

In the present embodiment, when the printer 110 operates in infrastructure connection, the AP 120 operates as a master station and the printer 110 operates as a slave device. That is, in the present embodiment, infrastructure connection refers to connection between the printer 110 operating as the slave device and the AP 120 operating as the master device. When the printer 110 establishes an infrastructure connection and the PC 100 establishes an infrastructure connection with the AP 120, communication via the AP 120 becomes possible between the printer 110 and the PC 100. The channels used for communication in infrastructure connection are determined by the AP 120, and so, the printer 110 performs communication in infrastructure connection using the channels determined by the AP 120. In the present embodiment, assume that the printer 110 can use channels corresponding to a 2.4-GHz frequency band and channels corresponding to a 5-GHz frequency band for communication in infrastructure connection. The printer 110 can also use channels corresponding to a Dynamic Frequency Selection (DFS) band of the 5-GHz frequency band for communication in infrastructure connection. In order to communicate with the printer 110 via the AP 120, the PC 100 needs to recognize that the printer 110 belongs to a network that has been formed by the AP 120 and to which the PC 100 belongs.

Regarding Network Setup Mode

The printer 110 can operate in network setup mode. A trigger for the printer 110 to start operation in the network setup mode may be, for example, that the user presses a button for the network setup mode or that the printer 110 starts (powers on) for the first time after arrival. The button for the network setup mode may be a hardware (physical) button provided in the printer 110 or a software button displayed by the printer 110 on the display device 117.

The printer 110 enables Wi-Fi communication when it starts operating in the network setup mode. Specifically, the printer 110 enables an AP (setup AP) inside the printer 110 dedicated to the network setup mode as Wi-Fi communication enabling processing. With this, the printer 110 enters a state in which it is possible to establish direct connection with the PC 100 via Wi-Fi. Assume that connection information (SSID and password) for connecting with the setup AP is held in advance in the setup program 103 installed on the PC 100 and the PC 100 knows in advance the connection information for connecting with the setup AP. Assume that, therefore, unlike connection information of an AP that is enabled in the direct connection mode, the connection information for connecting to the setup AP cannot be changed as desired by the user. In the network setup mode, the printer 110 may connect with the PC 100 via Wi-Fi Direct (WFD) instead of traditional Wi-Fi. That is, the printer 110 may operate as a group owner and receive a setting command from the PC 100 via WFD communication. Further, in the network setup mode, the printer 110 may be connected to the PC 100 via Bluetooth. Here, Bluetooth includes Bluetooth Classic and Bluetooth Low Energy (BLE). That is, for example, the printer 110 may operate as a slave device in BLE in the network setup mode and receive a setting command from the PC 100 via communication over BLE. Further, in the network setup mode, the printer 110 may be capable of executing both network setup via Wi-Fi and network setup via BLE. That is, the printer 110 may enable both Wi-Fi communication and BLE communication when it starts operating in the network setup mode. Specifically, the printer 110 may perform both enabling of the setup AP and enabling of an advertising state, in which advertisement information is transmitted via BLE so as to allow BLE connection, when it starts operating in the network setup mode.

As described above, the printer 110 operates in the network setup mode for executing network setup of the printer 110 according to a predetermined condition, which includes a press of a button by the user and the time of initial installation. When operating in the network setup mode, the printer 110 controls the wireless LAN I/F 116 and operates as a setup AP, which is enabled only during operation in the network setup mode. The setup AP is an access point that is different from an access point that is enabled during the above-described soft AP mode. Further, assume that the SSID of the setup AP includes a predetermined character string that can be recognized by the setup program 103 of the PC 100.

Further, assume that the printer 110 operating in the network setup mode uses a predetermined communication protocol (setup communication protocol) in communication with the PC 100 connected with the setup AP. The setup communication protocol is, more specifically, Simple Network Management Protocol (SNMP), for example.

The printer 110 stops operating in the network setup mode after a predetermined period of time has elapsed from the start of operation in the network setup mode and disables the setup AP. It also disables the setup AP when it receives, in the network setup mode, the connection information for connecting to the AP 120 and an instruction to change the wireless communication operation mode from the PC 100.

Network setup in which the PC 100 connects the printer 110 to the AP 120 will be described with reference to FIG. 2.

In order to establish direct connection between the wireless I/F of the PC 100 and the wireless I/F of the printer 110 operating as the setup AP, it is necessary to change network settings, such as a Dynamic Host Configuration Program setting (DHCP setting) and IP addresses. However, to change network settings, a privilege (administrator privilege) to change settings in the operating system (OS) is necessary. Further, the administrator privilege is necessary to obtain information for connecting to the AP 120 from the wireless profile information stored in the PC 100. Therefore, when the user does not have the administrator privilege, functions that use direct connection may be uniformly restricted. Network setup also falls under such functions. However, if network setup is uniformly restricted when the user does not have the administrator privilege, user convenience will dramatically decrease. In the present embodiment, even when the user does not have the administrator privilege, if a predetermined condition is satisfied, the user will be able to easily connect the printer 110 to the AP 120. The processing of FIG. 2 is realized, for example, by the CPU 101 of the PC 100 reading the setup program 103 stored in the ROM 102 out to the RAM 105 and executing it. Further, the processing of FIG. 2 starts when an instruction to execute the setup program 103 is received from the user using the input I/F 107 of the PC 100, for example.

In step S201, the CPU 101 displays an execution permission confirmation screen, which prompts the user to confirm whether to permit execution of the setup program 103 with the administrator privilege, on the display device 106.

Figure 3:
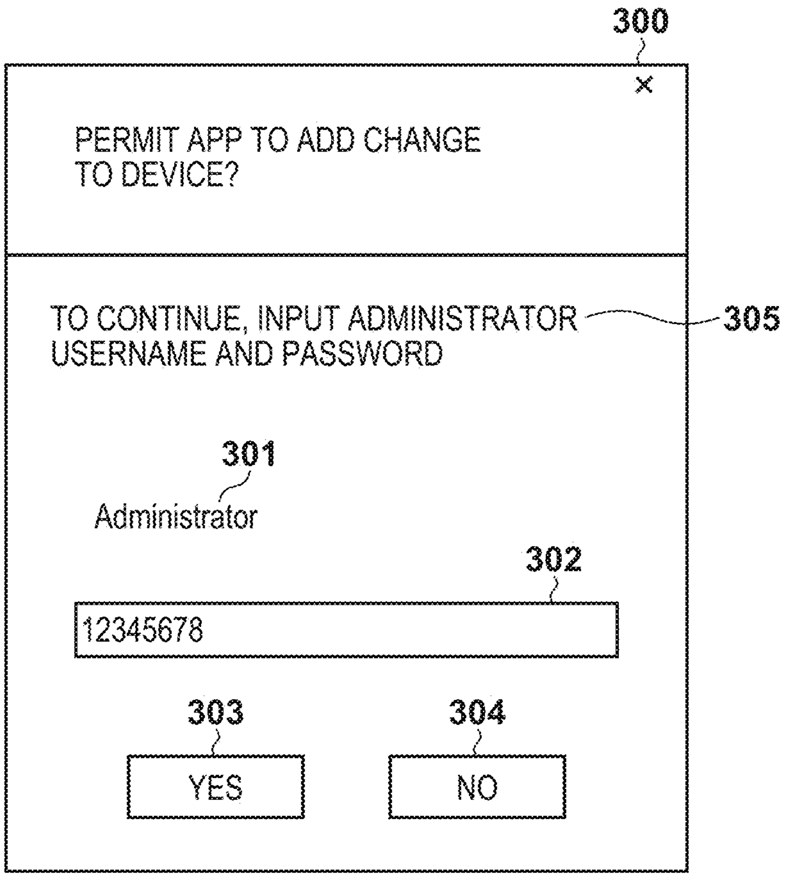
FIG. 3 is a diagram illustrating a user interface screen.

FIG. 3 is a diagram illustrating an example of the execution permission confirmation screen displayed in step S201. An execution permission confirmation screen 300 is a User Account Control (UAC) screen displayed by a UAC function of the OS based on the setup program 103 receiving an instruction to execute processing that requires the administrator privilege. The processing that requires administrator privileges is, for example, network setup processing for connecting the printer 110 to the AP 120. The User Account Control function of the OS will also be referred to as the UAC function below. The execution permission confirmation screen 300 includes a display region 301 for displaying the user name of an account having the administrator privilege and obtained by an API of the OS, an input region 302 for receiving input of a password, a "YES" button 303, and a "NO" button 304. FIG. 3 illustrates a state in which "12345678" has been inputted to the input region 302 as one example. "12345678" is an example of the password of an account that has the administrator privilege. The execution permission confirmation screen 300 displays a message 305 providing guidance so as to input of the user name and password of an account having the administrator privilege. If the "Yes" button 303 is pressed after the user has entered the user name and password of an account having the administrator privilege, it is permitted that the setup program 103 performs execution with the administrator privilege. Meanwhile, when the user presses the "No" button 304, execution by the setup program 103 with the administrator privilege is not permitted.

In step S202, the CPU 101 determines whether a privilege to execute the setup program 103 is the administrator privilege and stores a result of that determination in a storage region, such as the RAM 105. Specifically, for example, the determination is made based on whether execution with the administrator privilege has been permitted on the execution permission confirmation screen 300 displayed by the UAC function in step S201. If the privilege to execute the setup program 103 is already the administrator privilege, the processing of step S201 and step S202 need not be executed.

In step S203, the CPU 101 searches for the printer 110 operating as the setup AP. Hereinafter, the network setup mode will be referred to as the wireless setting mode. Specifically, for example, the setup program 103 searches for a beacon signal (hereinafter referred to as beacon) transmitted by the printer 110 operating in the wireless setting mode using the wireless LAN I/F 109. The beacon contains identification information, such as an SSID, and is assigned a name indicating that it is the printer 110 operating in the wireless setting mode. For example, a character string, "SETUP", in an SSID, "TS8xxx_SETUP_mmnnnn", indicates that the printer 110 named "TS8xxx" is in the wireless setting mode. Further, the SSID includes an identification number, "mmnnnn", which changes for each individual, in view of a case where there are a plurality of printers that are the same product.

In step S204, the CPU 101 performs wireless connection processing for connecting the printer 110 operating in the wireless setting mode and found in step S203 to a wireless network. The wireless connection processing will be described later in FIG. 4.

In step S205, the CPU 101 obtains a model-specific information file in which model-specific information related to the printer 110 is described from the printer 110. The model-specific information file describes a URL for downloading respective pieces of software, such as a driver installer that corresponds to the printer 110. Then, the CPU 101 references the URL for downloading respective pieces of software described in the obtained model-specific information file and downloads the respective pieces of software including the driver installer.

In step S206, the CPU 101 executes the driver installer downloaded in step S205 and executes installation of the printer driver of the printer 110 and print queue generation processing. In the present embodiment, description will be given assuming that printer driver installation and print queue generation processing are executed by the driver installer being executed. Instead of the printer driver being installed by the driver installer being executed, an extension application program for extending functions of a printer driver according to an OS standard function may be downloaded and installed. Then, print queue generation processing corresponding to the printer driver according to the OS standard function may be executed. The printer driver according to the OS standard function is, for example, an IPP Class Driver provided in Windows® 11. That is, it is not a unique printer driver according to the model of a printing device and is a standard printer driver that can be used across a plurality of printing devices. IPP is an abbreviation of Internet Printing Protocol.

Figure 2:
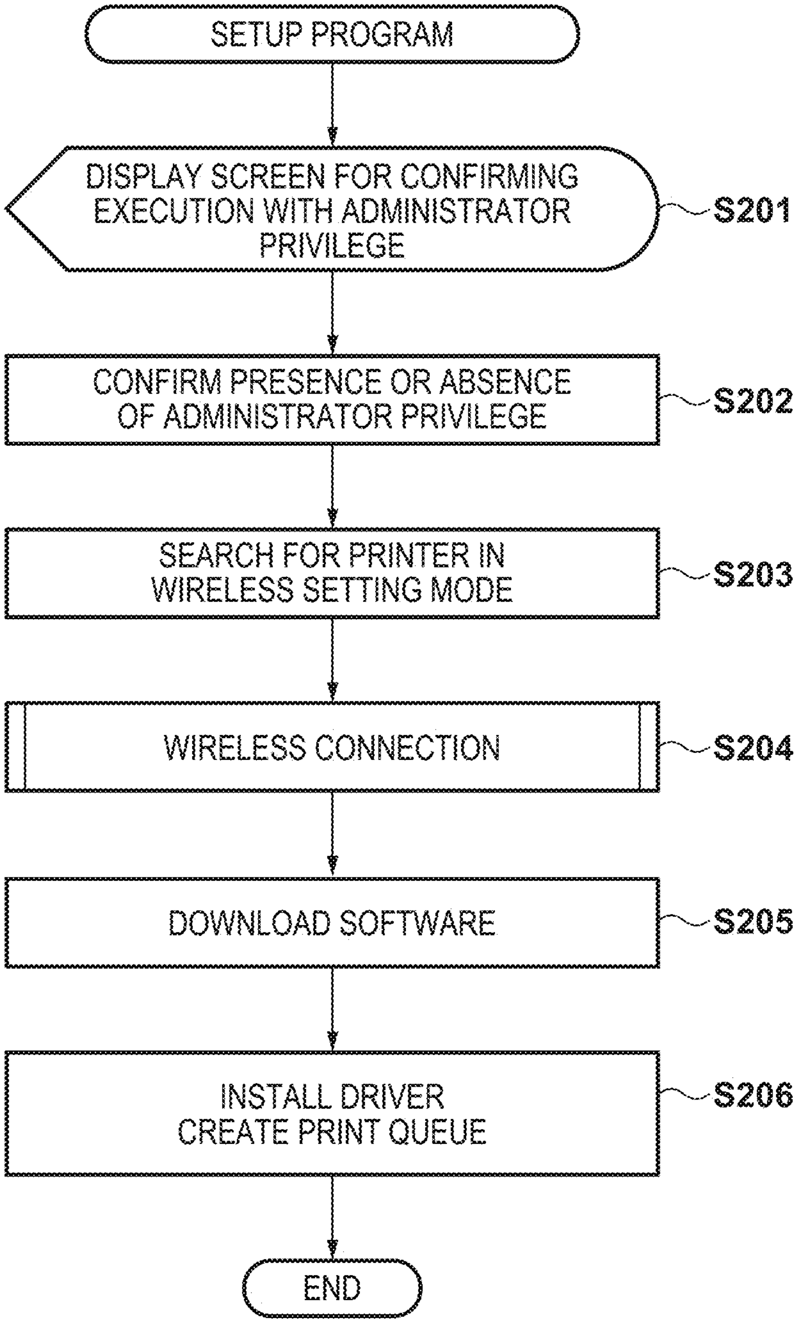
FIG. 2 is a flowchart for explaining processing performed in an electronic device.

Further, in the present embodiment, the model-specific information file is downloaded at the timing of step S205, but the downloading timing is not limited to that of FIG. 2. For example, the model-specific information may be downloaded at a timing at which a printer operating in the wireless setting mode is detected in step S401 of the wireless connection processing of step S204 to be described later and the model is identified. In that case, after step S204, the processing of step S205 need not be executed. After step S206, the processing of FIG. 2 ends.

Next, the wireless connection processing in which the setup program 103 connects the printer 110 to the wireless network of the AP 120 will be described with reference to FIG. 4.

Figure 4:
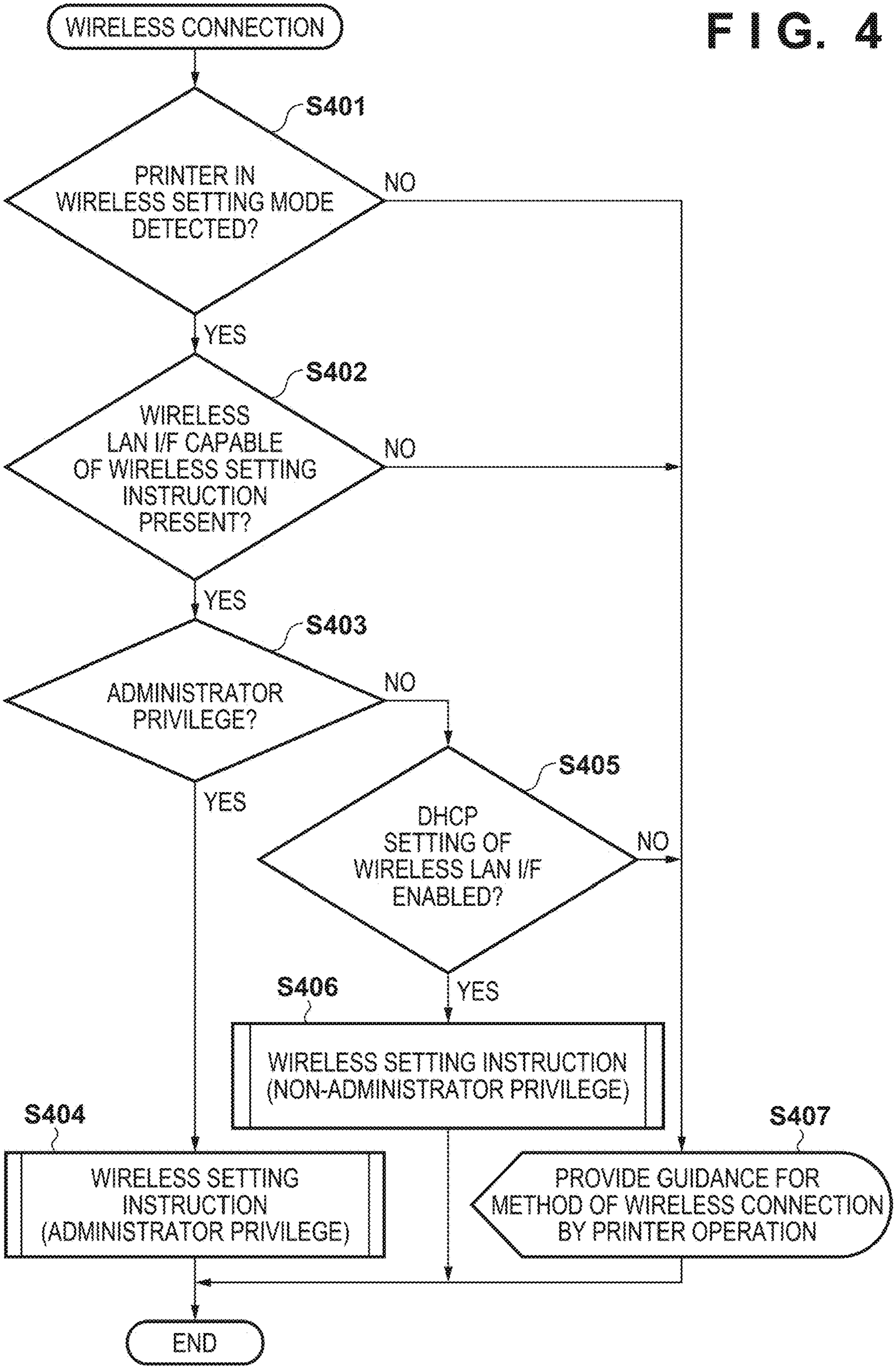
FIG. 4 is a flowchart for explaining processing performed in the electronic device.

FIG. 4 is a flowchart for explaining the processing of step S204. In step S401, the CPU 101 determines whether a printer 110 operating in the wireless setting mode has been detected based on a result of the search in step S203. If it is determined that a printer 110 operating in the wireless setting mode has been detected, the processing proceeds to step S402, and if it is determined that a printer 110 operating in the wireless setting mode has not been detected, the processing proceeds to step S407.

In step S402, the CPU 101 determines whether the wireless LAN I/F 109 is capable of executing wireless setting instruction. Specifically, the CPU 101 obtain information on whether the wired LAN I/F 108 or the wireless LAN I/F 109 is connected to the AP 120, whether the wireless LAN I/F 109 is enabled, and whether an IPv4 setting of the wireless LAN I/F 109 is enabled, using the API of the OS. If the wired LAN I/F 108 or the wireless LAN I/F 109 is connected to the AP 120, the wireless LAN I/F 109 is enabled, and the IPV4 setting of the wireless LAN I/F 109 is enabled, the CPU 101 determines that the wireless LAN I/F 109 is capable of executing wireless setting instruction. The wireless setting instruction will be described later in FIGS. 6 and 8. The determination processing of step S402 is, in other words, processing for determining whether the network settings are settings for wireless connection processing. If the wireless LAN I/F 109 is determined to be capable of executing wireless setting instruction, the processing proceeds to step S403, and if it is determined that the wireless LAN I/F 109 is not capable of executing wireless setting instruction, the processing proceeds to step S407.

In step S403, the CPU 101 determines whether the privilege to execute the setup program 103 is the administrator privilege based on the information stored in the storage region in step S202. For example, among the various setting states managed by the OS, determination is made based on information on whether execution has been permitted with the administrator privilege on the execution permission confirmation screen 300 displayed by the UAC function. If it is determined to be the administrator privilege, the processing proceeds to step S404, if it is determined not to be the administrator privilege, the processing proceeds to step S405.

In step S404, the CPU 101 executes wireless communication setting instruction in the case of administrator privilege with respect to a printer control program 113 in the printer 110. The processing of step S404 will be described later in FIG. 6. After step S404, the processing of FIG. 4 ends and proceeds to step S205 of FIG. 2.

In step S405, the CPU 101 determines whether the DHCP setting of the IPv4 setting of the wireless LAN I/F 109 capable of executing wireless setting instruction is enabled, using the API of the OS. DHCP is an abbreviation of Dynamic Host Configuration Protocol. If it is determined that the DHCP setting is enabled, the processing proceeds to step S406, and if it is determined that the DHCP setting is not enabled, such as disabled, the processing proceeds to step S407. The determination processing of step S405 is, in other words, processing for determining whether it is possible to designate the PC 100 and assign setting information (e.g., IP address) on the printer 110 side in a network of P2P connection between the PC 100 and the printer 110. If it is determined that the DHCP setting is enabled, even if it is determined that there is no administrator privilege, it is possible to designate the PC 100 and assign the setting information on the printer 110 side in the network of P2P connection between the PC 100 and the printer 110. Meanwhile, if it is determined that the DHCP setting is not enabled, it is not possible to designate the PC 100 and assign the setting information on the printer 110 side in the network of P2P connection between the PC 100 and the printer 110.

In step S406, the CPU 101 executes wireless communication setting instruction in the case where administrator privilege is unnecessary with respect to the printer control program 113 in the printer 110. The processing of step S406 will be described later in FIG. 8. Hereinafter, not needing the administrator privilege will also be referred to as non-administrator privilege. After step S406, the processing of FIG. 4 ends and proceeds to step S205 of FIG. 2.

In step S407, the CPU 101 displays a manual setting screen for providing guidance on a wireless connection method by operation of the printer on the display device 106. After step S407, the processing of FIGS. 2 and 4 ends.

Figure 5:
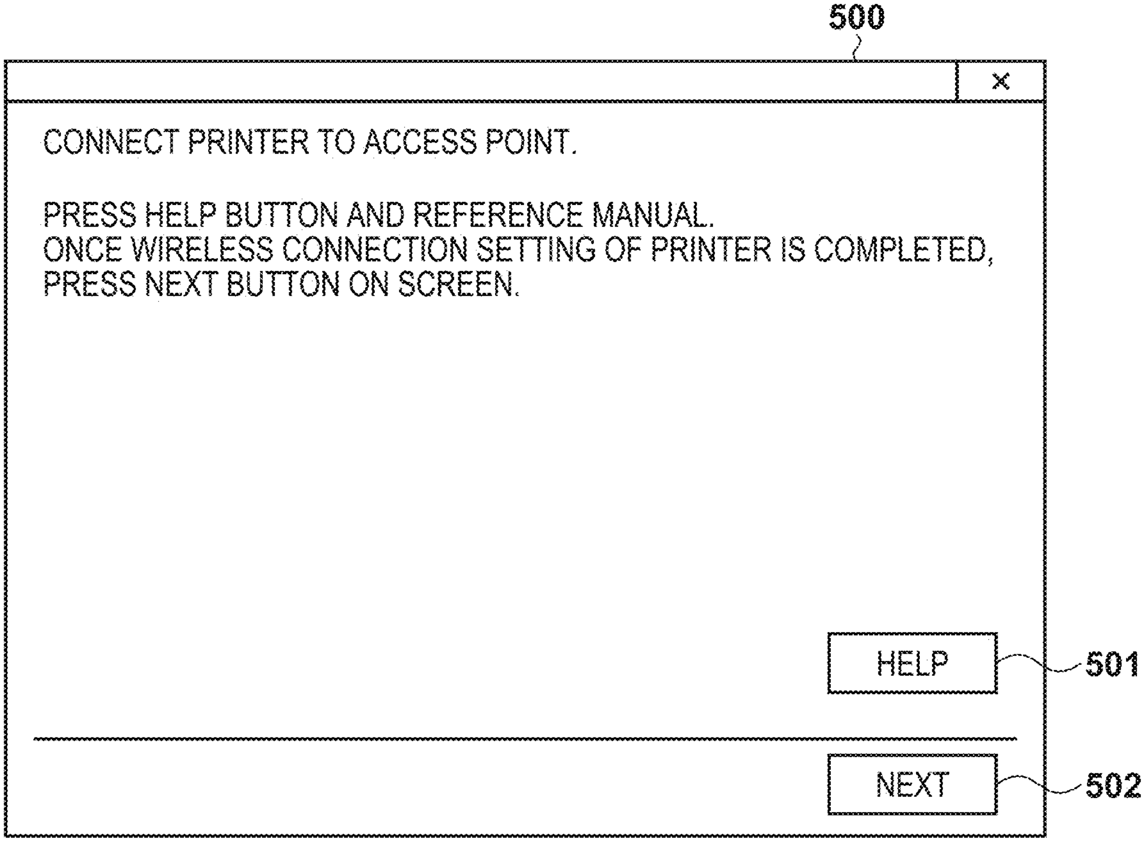
FIG. 5 is a diagram illustrating a user interface screen.

FIG. 5 is a diagram illustrating an example of the manual setting screen displayed in step S407. A manual setting screen 500 is a guidance screen for wirelessly connecting the printer 110 to the AP 120 by user operation on the printer 110 without establishing P2P connection between the PC 100 and the printer 110. Here, wireless connection between the printer 110 and the AP 120 is, for example, connection via Wi-Fi Protected Setup (WPS). The manual setting screen 500 includes a "HELP" button 501 and a "NEXT" button 502. The manual setting screen 500 displays a message prompting a user to press the "HELP" button 501 and reference a manual. The manual setting screen 500 displays a message prompting the user to operate the printer 110 to wirelessly connect the AP 120 and the wireless LAN I/F 116 and then press the "Next" button 502. When the user presses the "HELP" button 501, the setup program 103 opens a browser and displays a web manual that explains a method of wirelessly connecting the printer 110 to the AP 120. The web manual describes, for example, guidance on pressing respective WPS buttons of the printer 110 and the AP 120.

When the user presses the "NEXT" button 502 after wirelessly connecting the printer 110 to the AP 120, the processing of FIGS. 2 and 4 ends. In the present embodiment, it has been described that the "HELP" button 501 is pressed to open a browser and a web manual is displayed. However, a configuration in which, in addition to the manual setting screen 500 being displayed, a browser is opened and a web manual is displayed or a configuration in which a method of wirelessly connecting the printer 110 to the AP 120 is displayed on the manual setting screen 500 may be taken As described above, when the network settings are not settings for wireless connection processing, P2P connection between the PC 100 and the printer 110 is not established, and guidance for wirelessly connecting the printer 110 to the AP 120 by user operation is displayed. Further, even if the network settings are the settings for wireless connection processing, if the user does not have the administrator privilege, depending on whether the network settings satisfy a predetermined condition, P2P connection between the PC 100 and the printer 110 is established or the P2P connection is not established and guidance for wirelessly connecting the printer 110 to the AP 120 by user operation is displayed. That is, even if the user does not have the administrator privilege, if the network settings satisfy the predetermined condition, P2P connection between the PC 100 and the printer 110 is established. Meanwhile, if the user does not have the administrator privilege and the network settings do not satisfy the predetermined condition, the P2P connection is not established, and guidance for wirelessly connecting the printer 110 the AP 120 is displayed. Such display control processing makes it possible to reduce occasions in which the wireless connection processing fails and improve user experience (UX).

Next, wireless setting instruction in the case of the administrator privilege that the PC 100 performs with respect to the printer 110 will be described with reference to FIG. 6.

Figure 6:
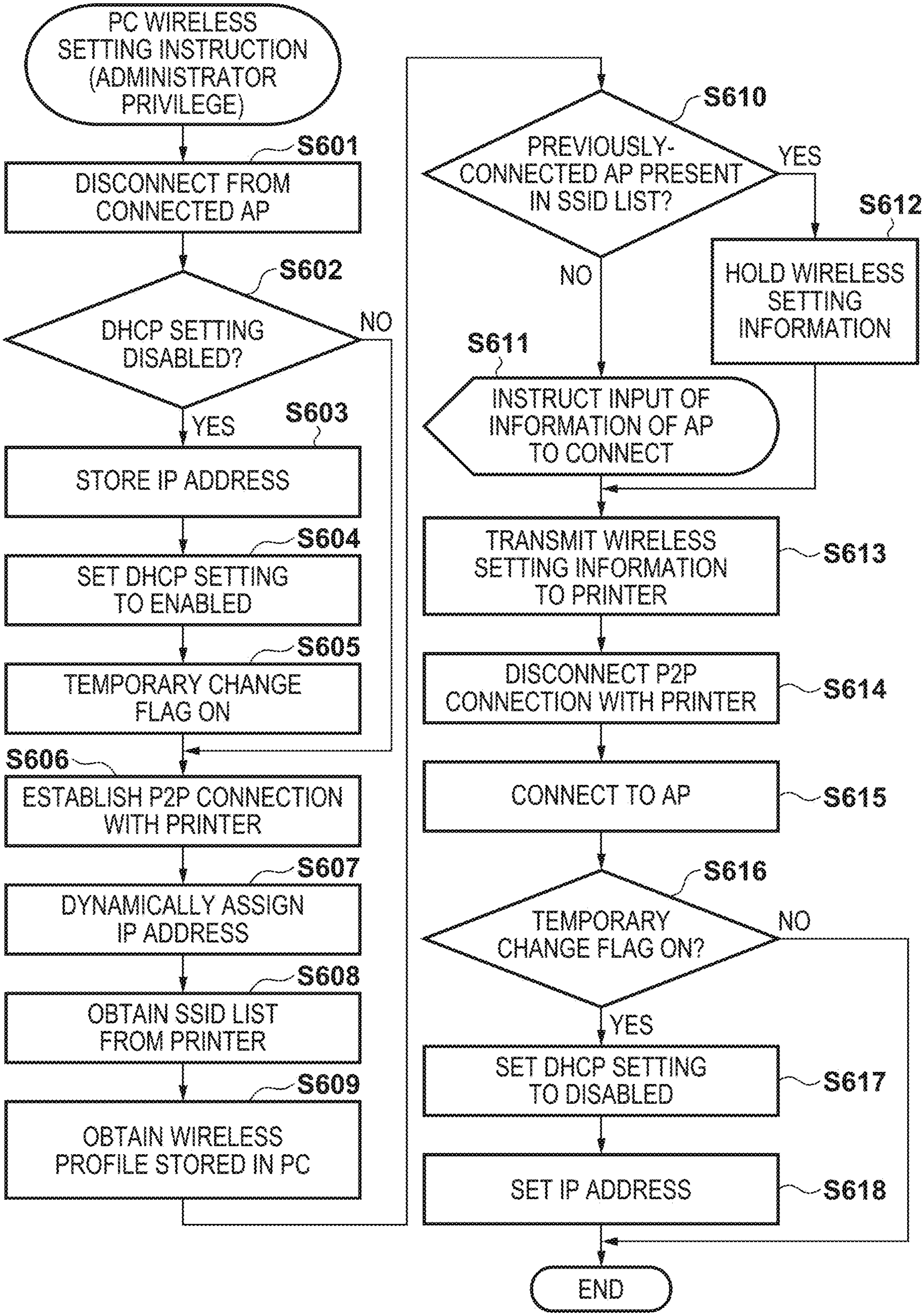
FIG. 6 is a flowchart for explaining processing performed in the electronic device.

FIG. 6 is a flowchart for explaining the processing of step S404 of FIG. 4. When processing for wireless setting instruction in the case of the administrator privilege is started, in step S601 the CPU 101 executes processing for disconnecting the wireless LAN connection 122 with the AP 120 with which it has been connected thus far. The present embodiment describes a configuration in which the PC 100 includes one wireless LAN I/F 109 capable of P2P connection as an example. Therefore, in step S601, the wireless LAN connection 122 with the AP 120 is temporarily disconnected. However, if the PC 100 includes a plurality of wireless LAN I/Fs capable of P2P connection, the processing of step S601 and the processing of step S615 to be described below need not be executed.

In step S602, the CPU 101 determines whether the DHCP setting of the IPv4 setting of the wireless LAN I/F 109 capable of P2P connection is disabled, using the API of the OS. If it is determined that the DHCP setting is disabled, the processing proceeds to step S603, and if it is determined that the DHCP setting is not disabled, and is enabled, for example, the processing proceeds to step S606.

In step S603, the CPU 101 obtains an IP address assigned to the wireless LAN I/F 109 using the API of OS and stores it in a storage region, such as the RAM 105. In step S604, the CPU 101 changes the DHCP setting of the IPV4 setting of the wireless LAN I/F 109 capable of P2P connection to enabled, using the API of the OS. In step S605, the CPU 101 changes a temporary change flag to on to indicate that the DHCP setting of the IPV4 setting of the wireless LAN I/F 109 has been temporarily changed. The temporary change flag is stored in advance in the storage region of the RAM 105, for example, as a flag indicating whether a setting change of the DHCP setting has been performed.

In step S606, the CPU 101 establishes P2P connection with the wireless LAN I/F 116 of the printer 110 operating in the wireless setting mode via the wireless LAN connection 123. The connection processing for P2P connection may be, for example, connection processing for P2P connection defined in IEEE 802.11.

In step S607, the CPU 101 is assigned an IP address according to DHCP by the printer 110 via Wi-Fi connection with the wireless LAN I/F 116 of the printer 110 operating in the wireless setting mode. By an IP address being assigned according to DHCP, the CPU 101 enters a state in which it can communicate with the printer 110.

In step S608, the CPU 101 obtains an SSID list from the printer 110 via P2P connection. The SSID list is a list indicating one or more access points detected by the printer 110 executing an AP search and with which the printer 110 can connect. The details of step S608 will be described later in FIG. 10.

In step S609, the CPU 101 references the wireless profile information included in the network information 104 of the PC 100, and then obtains wireless profile information including the SSID of an AP 120 which it had been connected to before (e.g., immediately before) the start of the processing of FIG. 6 and for which the wireless LAN connection 122 has been disconnected in step S601, and a password necessary for connecting to the AP 120. Hereinafter, the above AP 120 is called a previously-connected AP.

In step S610, the CPU 101 determines whether an SSID of the previously-connected AP obtained in step S609 is included in the SSID list obtained in step S608. If it is determined to be included in the SSID list, the processing proceeds to step S612, and if it is determined not to be included in the SSID list, the processing proceeds to step S611.

In step S611, the CPU 101 displays a network information input screen for accepting input of network information on the display device 106.

Figure 7:
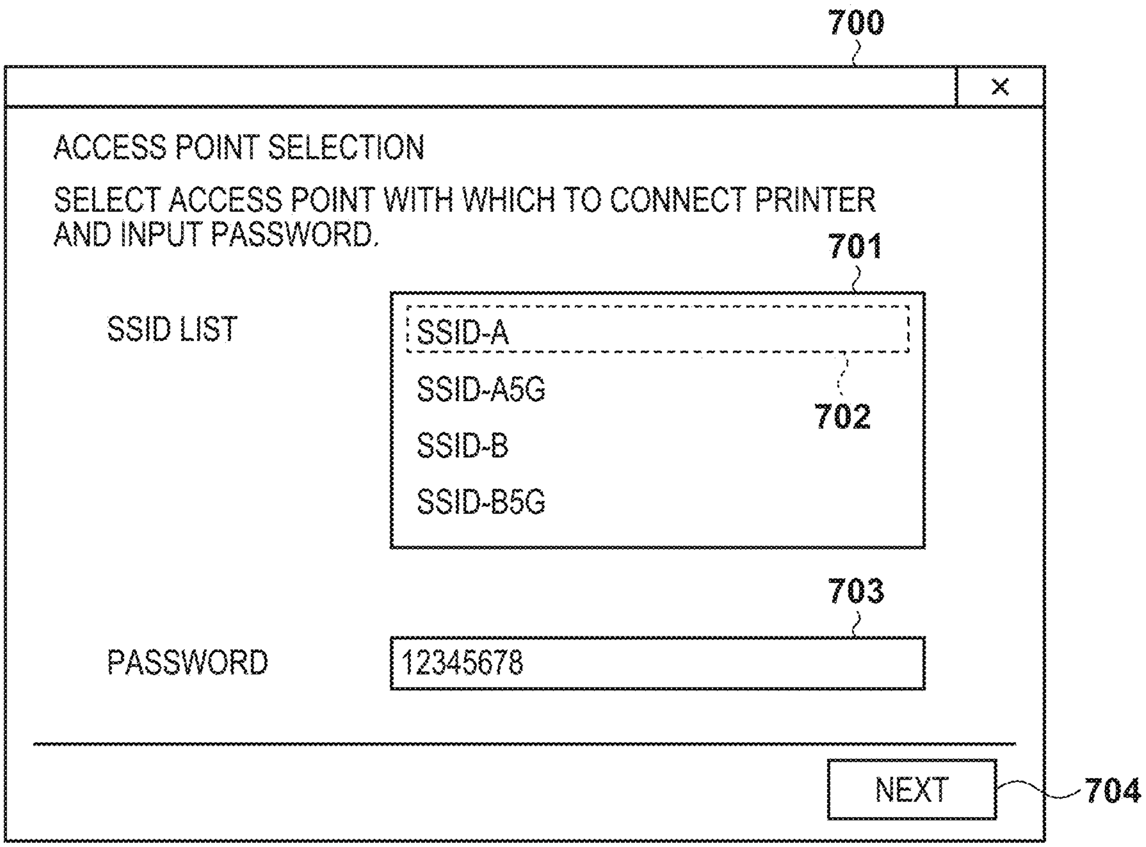
FIG. 7 is a diagram illustrating a user interface screen.

FIG. 7 is a diagram illustrating an example of the network information input screen displayed in step S611. A network information input screen 700 includes a drop-down list 701 for selecting an SSID name, an input region 703 for inputting a password, and a "NEXT" button 704. The drop-down list 701 lists information of the SSID list obtained from the printer 110 in step S608. The drop-down list 701 includes only access points with which the printer 110 can connect, and so, a case where the previously-connected AP is not included in the received list is, in other words, a case where the printer 110 cannot connect to the previously-connected AP. An access point that can be connected according to an encryption method that does not support the printer 110 will not be included in the drop-down list 701 as the printer 110 cannot connect to it. An access point that can be connected through a frequency band that does not support the printer 110 will not be included in the drop-down list 701 as the printer 110 cannot connect to it.

FIG. 7 illustrates a state in which "SSID-A" 702 is selected, and "SSID-A" is an SSID of the AP 120 (different from the previously-connected AP). In FIG. 7, "12345678" is inputted to the input region 703, and "12345678" is the password of the SSID "SSID-A" of the AP 120. In the present embodiment, an example in which SSIDs are listed in the drop-down list 701 has been described, but a configuration in which an input region is employed and the user is prompted to input an SSID name may be taken. The network information input screen 700 displays guidance prompting the user to select an AP which to connect the printer 110 and input the password of the AP. When the user selects an AP, inputs the password of the AP, and presses a "NEXT" button 704, the CPU 101 holds the SSID selected in the drop-down list 701 and the password inputted in the input region 703 in a storage region, such as the RAM 105, as wireless setting information to be transmitted to the printer 110.

In step S612, the CPU 101 holds an SSID that matched with the previously-connected AP in the SSID list and the password obtained from the wireless profile information in step S609 in a storage region, such as the RAM 105, as the wireless setting information.

In step S613, the CPU 101 transmits wireless setting information to the printer 110 as wireless setting instruction via a P2P connection. The wireless setting information includes the SSID and the password of the AP 120. In step S614, the CPU 101 disconnect the wireless LAN connection 123 (P2P connection) with the wireless LAN I/F 116 of the printer 110 operating in the wireless setting mode. The processing for disconnecting the P2P connection may be, for example, the processing for disconnecting a P2P connection defined in IEEE 802.11. In step S615, the CPU 101 reestablishes the wireless LAN connection 122 via infrastructure connection with the AP 120 from which it has been disconnected in step S601.

In step S616, the CPU 101 determines whether the temporary change flag stored in the storage region is on. If it is determined that the temporary change flag is ON, the processing proceeds to step S617, and if it is determined that the temporary change flag is not on, the processing of FIGS. 4 and 6 ends.

In step S617, the CPU 101 changes the DHCP setting of the IPv4 setting of the wireless LAN I/F 109 from enabled to disabled, using the API of the OS. In step S618, the CPU 101 sets the IP address stored in a storage region, such as the RAM 105, in step S603 as an IP address of the wireless LAN I/F 109, using the API of the OS. After step S618, the processing of FIGS. 4 and 6 ends.

As described above, in the present embodiment, if the DHCP setting is disabled, the DHCP setting is changed to enabled after the IP address of the wireless LAN I/F 109 has been stored in the storage region. This makes it possible to allow assigning of an IP address from the printer 110. Then, after the P2P connection with the printer 110 has been disconnected, the DHCP setting is changed to disabled, and the IP address previously stored in the internal storage region is set as the IP address of the wireless LAN I/F 109. This makes it possible to retain the network settings (IP address) prior to the wireless connection processing.

Next, wireless setting instruction in the case of the non-administrator privilege that the PC 100 performs with respect to the printer 110 will be described with reference to FIG. 8.

Figure 8:
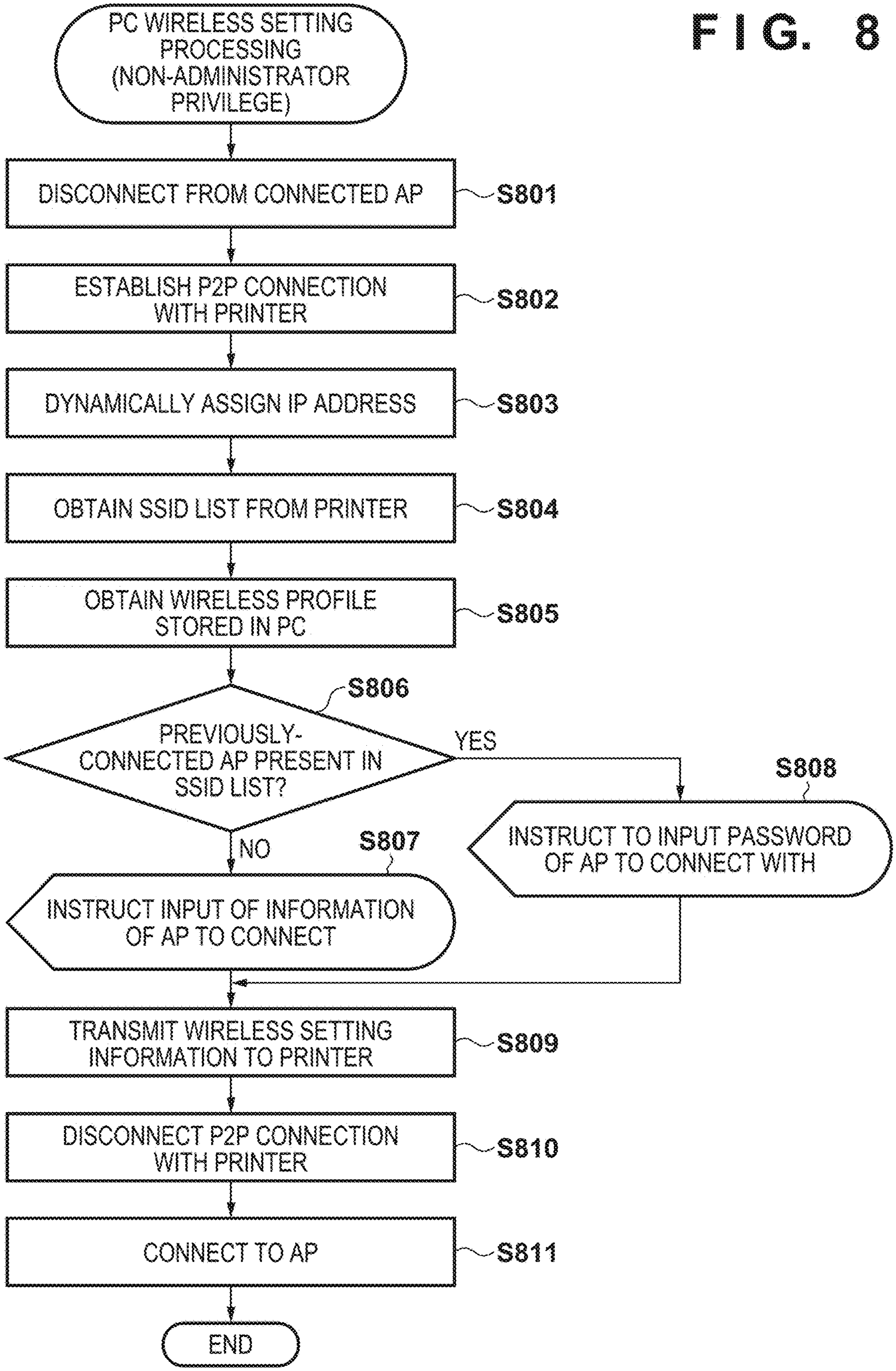
FIG. 8 is a flowchart for explaining processing performed in the electronic device.

FIG. 8 is a flowchart for explaining the processing of step S406 of FIG. 4. When processing for wireless setting instruction in the case of non-administrator privilege is started, the processing of FIG. 8 is executed. Steps S801 to S807 and S809 to S811 of FIG. 8 are similar to steps S601, S606 to S611, and S613 to S615 of FIG. 6, and so, descriptions thereof will be omitted.

If it is determined in step S806 that the SSID of the previously-connected AP obtained in step S805 is included in the SSID list obtained from the printer 110, the processing proceeds to step S808.

In step S808, the CPU 101 displays a password input screen for accepting input of a password on the display device 106.

Figure 9:
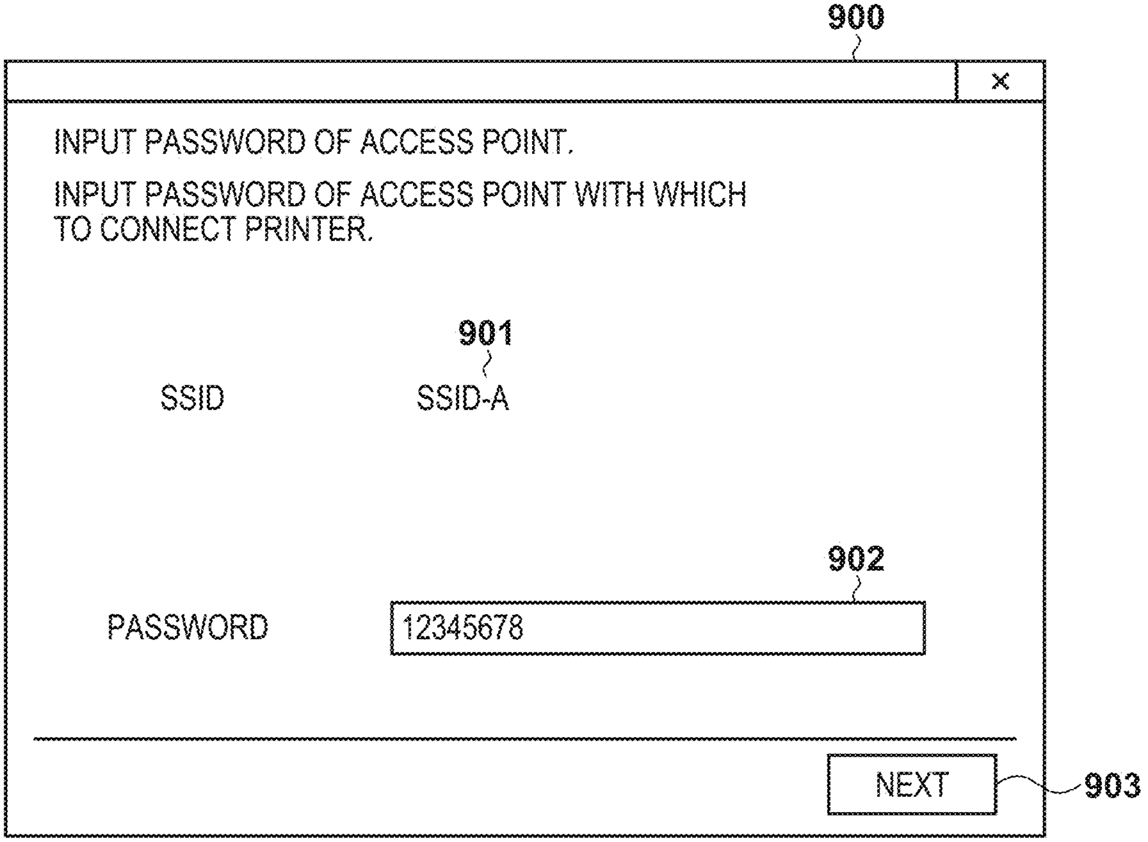
FIG. 9 is a diagram illustrating a user interface screen.

FIG. 9 is a diagram illustrating an example of the password input screen displayed in step S808. A password input screen 900 includes a display region 901 for displaying the SSID of the previously-connected AP obtained in step S805, an input region 902 for inputting a password, and a "NEXT" button 903. As one example, "12345678" is inputted to the input region 902, and "12345678" is the password of the SSID "SSID-A" of the previously-connected AP. The password input screen 900 displays guidance prompting input of the password of the AP 120. When the user inputs a password and presses the "NEXT" button 903, the CPU 101 holds an SSID that matched with the previously-connected AP in the SSID list obtained from the printer 110 and the password inputted in the input region 902 in a storage region, such as the RAM 105, as wireless setting information.

As described above, in the present embodiment, even if the user does not have the administrator privilege, if the DHCP setting is enabled, the wireless connection processing is executed via P2P connection between the PC 100 and the printer 110. This makes it possible to reduce occasions where the wireless connection processing fails due to not having the administrator privilege and improve UX. In addition, a configuration in which, in the wireless connection processing performed when the user does not have the administrator privilege, the user is prompted to input the password of a previously-connected AP is taken. This makes it possible to execute the wireless connection processing even when the user does not have the administrator privilege.

Next, wireless setting processing performed in the printer 110 will be described with reference to FIG. 10.

Figure 10:
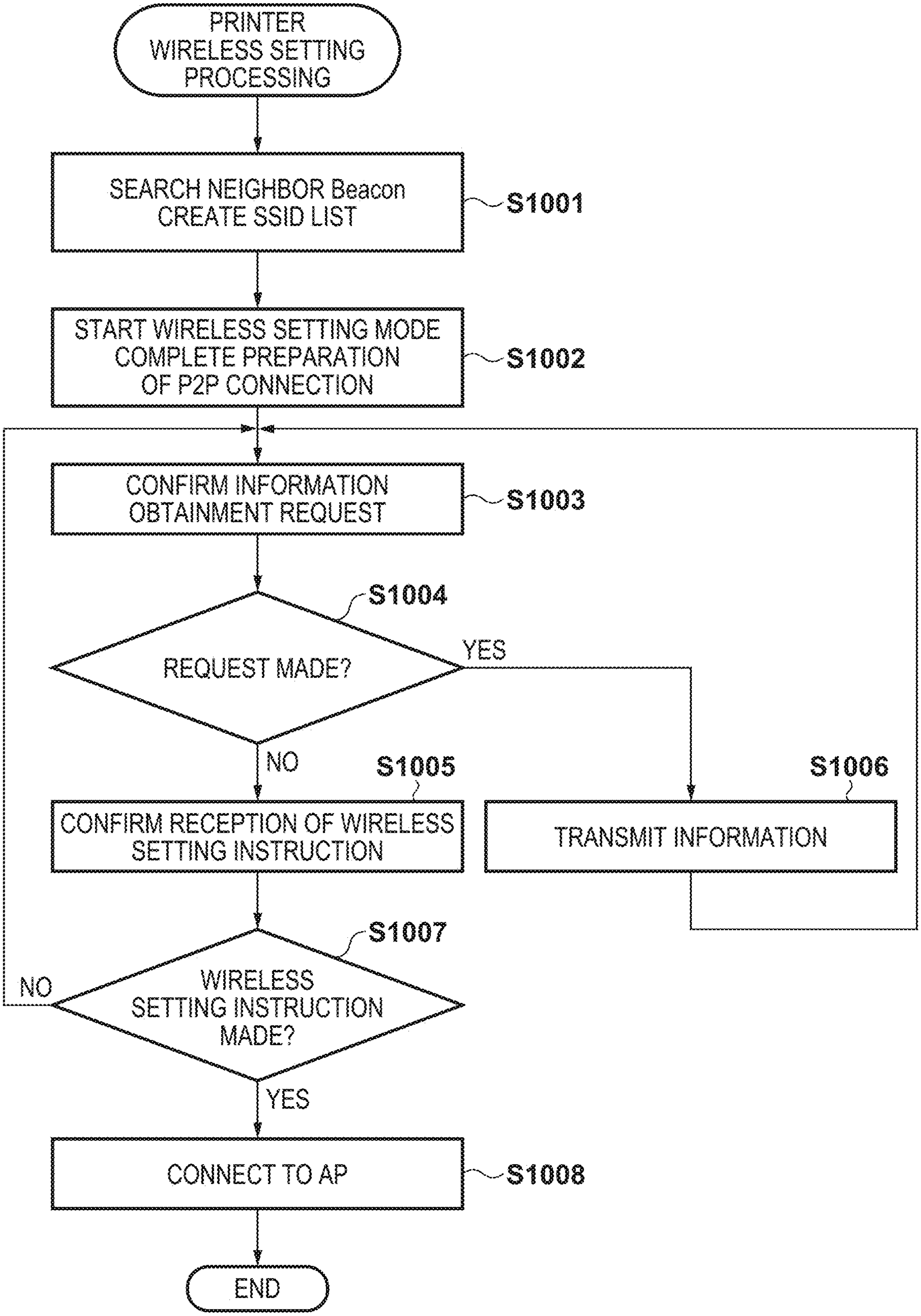
FIG. 10 is a flowchart for explaining processing performed in an external device.

FIG. 10 is a flowchart for explaining wireless setting processing performed by the printer 110. The processing of FIG. 10 is realized, for example, by the CPU 111 of the printer 110 reading the program 113 stored in the ROM 112 out to the RAM 115 and executing it. The processing of FIG. 10 starts with a specific condition as a trigger. For example, the specific condition may be that an instruction prompting a specific operation using the input I/F 118 of the printer 110 is displayed on the display device 117 and a specific operation from the user is accepted. The specific operation may be an operation on a panel or may be an operation on a housing of the printer 110. Further, the specific condition may be that the user purchases the printer 110 and powers it on for the first time (the time of arrival).

In step S1001, the CPU 111 searches for neighbor beacons using the wireless LAN I/F 116 and creates an SSID list. Similarly to the description of FIG. 6, the SSID list is a list indicating one or more access points found by the printer 110 executing an AP search and with which the printer 110 can connect.

In step S1002, the CPU 111 starts the wireless setting mode and prepares for P2P connection via the wireless LAN connection 123 with the PC 100. P2P connection preparation is processing in which the wireless LAN I/F 116 is operated in the wireless setting mode, transmits a beacon, and waits for connection of the PC 100. The printer 110 at this point is the above-described "printer 110 operating in the wireless setting mode".

Once the PC 100 connects to the wireless LAN I/F 116 of the printer 110 operating in the wireless setting mode and P2P connection via the wireless LAN connection 123 is established, the processing proceeds to step S1003.

In step S1003, the CPU 111 confirms an information obtainment request from the PC 100. In step S1004, the CPU 111 determines whether there is a request for an SSID list from the PC 100 to the printer 110 as an information obtainment request from the PC 100. A request for a SSID list is a request for an SSID list from the PC 100 to the printer 110 made in step S608 of FIG. 6 and step S804 of FIG. 8. If it is determined that there is a request for an SSID list, the processing proceeds to step S1006, and if it is determined that there is no request for an SSID list, the processing proceeds to step S1005. In step S1006, the CPU 111 transmits an SSID list to the PC 100, which is the request source. Then, the processing is repeated from step S1003.

In step S1005, the CPU 111 confirms an instruction from the PC 100. In step S1007, the CPU 111 determines whether there is a wireless setting instruction from the PC 100 to the printer 110 as an instruction from the PC 100. The wireless setting instruction here is wireless setting instruction made as transmission of the wireless setting information from the PC 100 to the printer 110 in step S613 of FIG. 6 and step S809 of FIG. 8. If it is determined that there is a wireless setting instruction, the processing proceeds to step S1008, if it is determined that there is no wireless setting instruction, the processing is repeated from step S1003.

In step S1008, the CPU 111 ends the wireless setting mode and transitions to the infrastructure mode. That is, the CPU 111 connects the wireless LAN I/F 116 to the SSID of the AP 120 instructed by the PC 100 and establishes wireless connection 124 via an infrastructure connection. Thereafter, the printer 110 can perform communication via a network formed by the connected AP 120. After step S1008, the processing of FIG. 10 ends.

As described above, according to the present embodiment, it is possible to display appropriate guidance for wirelessly connecting the printer 110 to a specific AP 120 according to presence or absence of the administrator privilege and network settings. As a result, it possible to reduce occasions where the wireless connection processing for the printer 110 fails and improve UX.

Other Embodiments

Various kinds of control described above to be performed by the CPU 101 of the PC 100 may be performed by one piece of hardware, or a plurality of pieces of hardware (e.g., plurality of processors and circuits) may control the entire device by distributing processing.

Further, in the above-described embodiment, a case where the PC 100 is adopted as the electronic device has been described as an example, but the present invention is not limited to this example, and any electronic device capable of communicating in direct communication mode can be adopted. That is, a personal computer or a PDA, a mobile phone terminal, a smartphone, a tablet terminal, a music player, a gaming device, an electronic book reader, and the like can be adopted as the electronic device. Although the printer 110 has been described as an example of the external device in the present embodiment, the invention is not limited to this example, and any external device that can be utilized according to an instruction or control from the electronic device can be adopted. That is, a printer, a scanner, a video output device, an audio output device (e.g., smart speaker), a media streaming player, and the like can be adopted as the external device. The video output device is, for example, a device that realizes streaming reproduction in a display device connected via a video output terminal, such as an HDMI®, by obtaining (downloading) a moving image on the Internet specified by a URL instructed by the electronic device and outputting it to the display device and also realizes mirror display.

Mirror display is to display content displayed on the electronic device also on the display device. An example of communication by direct connection using a wireless LAN has been described as the direct communication mode. However, the present invention is not limited thereto, and direct connection may be realized by another type of communication, such as Bluetooth, BLE, and NFC.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-084161, filed May 22, 2023, which is hereby incorporated by reference herein in its entirety.

What is claimed is:

1. A non-transitory computer-readable storage medium storing one or more programs configured to cause one or more computers to function as:

an obtainment unit configured to obtain predetermined information on whether a privilege is an administrator privilege; and a control unit configured to perform control so as to: based on the predetermined information obtained by the obtainment unit, in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein the control unit further performs control so as to:

in a case where the privilege is the administrator privilege and the state of the setting related to the network does not satisfy the predetermined condition, change the setting so as to be in a setting state that satisfies the predetermined condition and perform communication in the first communication mode with the external device.

2. The non-transitory computer-readable storage medium storing the one or more programs according to claim 1, wherein a setting change in which a setting state that does not satisfy the predetermined condition is changed to the setting state that satisfies the predetermined condition is a setting change that requires the administrator privilege.

3. The non-transitory computer-readable storage medium storing the one or more programs according to claim 2, wherein the setting state that satisfies the predetermined condition is a setting state in which the external device can assign, to an electronic device, setting information for the external device to, in the first communication mode, specify the electronic device and perform communication.

4. The non-transitory computer-readable storage medium storing the one or more programs according to claim 2, wherein the setting state that satisfies the predetermined condition is a setting state in which Dynamic Host Configuration Protocol (DHCP) is enabled.

5. The non-transitory computer-readable storage medium storing the one or more programs according to claim 2, wherein when the external device communicates in the first communication mode with an electronic device, the external device assigns, to the electronic device, setting information for the external device to, in the first communication mode, specify the electronic device and perform communication.

6. The non-transitory computer-readable storage medium storing the one or more programs according to claim 1, wherein the control unit further performs control so as to:

in a case where the privilege is the administrator privilege, obtain, from history information, specific information for connecting in a second communication mode, which is different from the first communication mode, with a specific access point and transmit, to the external device connected in the first communication mode, the specific information, and in a case where the privilege is not the administrator privilege, not obtain the specific information from the history information and transmit, to the external device connected in the first communication mode, information that has been inputted by a user as the specific information.

7. The non-transitory computer-readable storage medium storing the one or more programs according to claim 6, wherein the second communication mode is mode of communication by infrastructure connection.

8. The non-transitory computer-readable storage medium storing the one or more programs according to claim 7, wherein the first communication mode is mode of communication by direct connection.

9. The non-transitory computer-readable storage medium storing the one or more programs according to claim 6, wherein the control unit performs control so as to:

connect the external device to the specific access point in the second communication mode by transmitting the specific information to the external device by communication in the first communication mode.

10. The non-transitory computer-readable storage medium storing the one or more programs according to claim 6, wherein the specific information includes a password for connecting with the specific access point.

11. The non-transitory computer-readable storage medium storing the one or more programs according to claim 6, wherein the specific information includes identification information of the specific access point.

12. The non-transitory computer-readable storage medium storing the one or more programs according to claim 6, wherein the specific access point is an access point with which an electronic device had been connected in the second communication mode immediately before communicating in the first communication mode with the external device.

13. The non-transitory computer-readable storage medium storing the one or more programs according to claim 1, wherein the external device is a printing device, and the control unit further performs control so as to: after communicating in the first communication mode with the external device, perform setting processing for allowing use of the external device from an electronic device.

14. The non-transitory computer-readable storage medium storing the one or more programs according to claim 13, wherein the setting processing includes processing for generating a print queue that corresponds to the external device.

15. The non-transitory computer-readable storage medium storing the one or more programs according to claim 1, wherein the predetermined information is information based on an operation performed by a user on a User Account Control (UAC) screen displayed by a UAC function of an operating system.

16. The non-transitory computer-readable storage medium storing the one or more programs according to claim 15, wherein the one or more computers are further caused to function as:

a display control unit configured to control a computer of an electronic device to display the UAC screen.

17. An electronic device comprising:

at least one memory and at least one processor which function as:

an obtainment unit configured to obtain predetermined information on whether a privilege is an administrator privilege; and based on the predetermined information obtained by the obtainment unit, in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein in a case where the privilege is the administrator privilege and the state of the setting related to the network does not satisfy the predetermined condition, change the setting so as to be in a setting state that satisfies the predetermined condition and perform communication in the first communication mode with the external device.

18. A method of controlling an electronic device, the method comprising:

obtaining predetermined information on whether a privilege is an administrator privilege; and based on the obtained predetermined information, controlling so as to: in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein in a case where the privilege is the administrator privilege and the state of the setting related to the network does not satisfy the predetermined condition, change the setting so as to be in a setting state that satisfies the predetermined condition and perform communication in the first communication mode with the external device.

19. A non-transitory computer-readable storage medium storing one or more programs configured to cause one or more computers to function as:

an obtainment unit configured to obtain predetermined information on whether a privilege is an administrator privilege; and a control unit configured to perform control so as to: based on the predetermined information obtained by the obtainment unit, in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein the control unit further performs control so as to:

in a case where the privilege is the administrator privilege, obtain, from history information, specific information for connecting in a second communication mode, which is different from the first communication mode, with a specific access point and transmit, to the external device connected in the first communication mode, the specific information, and in a case where the privilege is not the administrator privilege, not obtain the specific information from the history information and transmit, to the external device connected in the first communication mode, information that has been inputted by a user as the specific information.

20. An electronic device comprising:

at least one memory and at least one processor which function as:

an obtainment unit configured to obtain predetermined information on whether a privilege is an administrator privilege; and based on the predetermined information obtained by the obtainment unit, in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein in a case where the privilege is the administrator privilege, obtain, from history information, specific information for connecting in a second communication mode, which is different from the first communication mode, with a specific access point and transmit, to the external device connected in the first communication mode, the specific information, and in a case where the privilege is not the administrator privilege, not obtain the specific information from the history information and transmit, to the external device connected in the first communication mode, information that has been inputted by a user as the specific information.

21. A method of controlling an electronic device, the method comprising:

obtaining predetermined information on whether a privilege is an administrator privilege; and based on the obtained predetermined information, controlling so as to: in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein control is further performed so as to: in a case where the privilege is the administrator privilege, obtain, from history information, specific information for connecting in a second communication mode, which is different from the first communication mode, with a specific access point and transmit, to the external device connected in the first communication mode, the specific information, and in a case where the privilege is not the administrator privilege, not obtain the specific information from the history information and transmit, to the external device connected in the first communication mode, information that has been inputted by a user as the specific information.

22. A non-transitory computer-readable storage medium storing one or more programs configured to cause one or more computers to function as:

an obtainment unit configured to obtain predetermined information on whether a privilege is an administrator privilege; and a control unit configured to perform control so as to: based on the predetermined information obtained by the obtainment unit, in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein the external device is a printing device, and the control unit further performs control so as to: after communicating in the first communication mode with the external device, perform setting processing for allowing use of the external device from an electronic device.

23. An electronic device comprising:

at least one memory and at least one processor which function as:

an obtainment unit configured to obtain predetermined information on whether a privilege is an administrator privilege; and based on the predetermined information obtained by the obtainment unit, in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein the external device is a printing device, and after communicating in the first communication mode with the external device, perform setting processing for allowing use of the external device from an electronic device.

24. A method of controlling an electronic device, the method comprising:

obtaining predetermined information on whether a privilege is an administrator privilege; and based on the obtained predetermined information, controlling so as to: in a case where the privilege is the administrator privilege, regardless of whether a state of a setting related to a network satisfies a predetermined condition, perform communication in a first communication mode with an external device, in a case where the privilege is not the administrator privilege and the state of the setting related to the network satisfies the predetermined condition, perform communication in the first communication mode with the external device, and in a case where the privilege is not the administrator privilege and the state of the setting related to the network does not satisfy the predetermined condition, not perform communication in the first communication mode with the external device, wherein the external device is a printing device, and further controlling so as to: after communicating in the first communication mode with the external device, perform setting processing for allowing use of the external device from an electronic device.

* * * * *